United States Patent [19]

Gill

[11] Patent Number: 5,748,399
[45] Date of Patent: May 5, 1998

[54] RESETTABLE SYMMETRIC SPIN VALVE

[75] Inventor: Hardayal Singh Gill, Portola Valley, Calif.

[73] Assignee: International Business Machines Corporation, Armonk, N.Y.

[21] Appl. No.: 855,141

[22] Filed: May 13, 1997

[51] Int. Cl.$^6$ .............................. G11B 5/03; G11B 5/39
[52] U.S. Cl. .............................. 360/66; 360/113
[58] Field of Search ............... 360/113, 66; 324/252; 338/32 R

[56] References Cited

U.S. PATENT DOCUMENTS

| | | | |
|---|---|---|---|
| 4,103,315 | 7/1978 | Hempstead et al. | 360/110 |
| 4,809,109 | 2/1989 | Howard et al. | 360/113 |
| 5,027,243 | 6/1991 | Gill et al. | 360/113 |
| 5,159,513 | 10/1992 | Dieny et al. | 360/113 |
| 5,193,038 | 3/1993 | Smith | 360/113 |
| 5,206,590 | 4/1993 | Dieny et al. | 324/252 |
| 5,262,914 | 11/1993 | Chen et al. | 360/113 |
| 5,264,980 | 11/1993 | Mowry et al. | 360/113 |
| 5,287,238 | 2/1994 | Baumgart et al. | 360/113 |
| 5,301,079 | 4/1994 | Cain et al. | 360/113 |
| 5,341,261 | 8/1994 | Dieny et al. | 360/113 |
| 5,471,358 | 11/1995 | Tadokoro et al. | 360/113 |
| 5,508,866 | 4/1996 | Gill et al. | 360/113 |
| 5,528,440 | 6/1996 | Fontana et al. | 360/113 |
| 5,557,491 | 9/1996 | Gill | 360/113 |
| 5,561,368 | 10/1996 | Dovek et al. | 324/252 |
| 5,627,703 | 5/1997 | Smith | 360/113 |
| 5,648,885 | 7/1997 | Nishioka et al. | 360/113 |
| 5,677,625 | 10/1997 | Dieny | 360/113 |
| 5,684,658 | 11/1997 | Shi et al. | 360/113 |

FOREIGN PATENT DOCUMENTS

| | | |
|---|---|---|
| 0628835A2 | 4/1994 | European Pat. Off. |
| 0676746A1 | 3/1995 | European Pat. Off. |
| 4358310 | 12/1992 | Japan |
| 6060336 | 3/1994 | Japan |
| 6150259 | 5/1994 | Japan |
| WO96/38740 | 12/1996 | WIPO |

OTHER PUBLICATIONS

*J. Appl. Phys.*, vol. 76, No. 9, Nov. 1, 1994, "Distribution of Blocking Temperature in Bilayered $Ni_{81}Fe_{19}/NiO$ Films", S. Soeya et al., pp. 5356–5360.

*J. Appl. Phys.*, vol. 79, No. 8, Apr. 15, 1996, "Exchange Coupling of Sputter Deposited NiCo–O/NiFe Thin Films", M. Tan et al., pp. 5012–5014.

(List continued on next page.)

*Primary Examiner*—Robert S. Tupper
*Attorney, Agent, or Firm*—Baker Maxham Jester & Meador

[57] ABSTRACT

A read sensor includes first and second symmetric spin valves with resettable magnetization directions. The first spin valve includes an antiferromagnetic layer, a ferromagnetic pinned layer, a non-magnetic conductor layer, then a ferromagnetic free layer. The ferromagnetic free layer is shared by the first and second spin valves. Upon the ferromagnetic free layer lies a non-magnetic conductor layer, then an inner ferromagnetic pinned layer and an outer ferromagnetic pinned layer sandwiching an exchange coupling layer. The exchange coupling layer exhibits sufficient exchange coupling with the sandwiching ferromagnetic pinned layers to pin these layers' magnetization directions in antiparallel directions. A second antiferromagnetic layer may be provided adjacent the second spin valve's outer ferromagnetic pinned layer. Directing a current pulse of suitable duration and magnitude through the conductors heats the antiferromagnetic layers beyond their blocking temperatures, providing the antiferromagnetic layers with a magnetization direction in accordance with the pulse's magnetic field. The newly established magnetization directions of the antiferromagnetic layers pins the first spin valve's ferromagnetic pinned layer as well as the second spin valve's outer ferromagnetic pinned layer. Furthermore, pinning of the second spin valve's outer ferromagnetic pinned layer establishes the magnetization direction of the second spin valve's inner ferromagnetic pinned layer due to the high exchange coupling between these two layers. Alternatively, the second antiferromagnetic layer may be omitted, with the second spin valve's inner and outer ferromagnetic pinned layers having uneven thicknesses to facilitate biasing of these layers using an external magnetic field.

30 Claims, 7 Drawing Sheets

OTHER PUBLICATIONS

*IEEE Transactions on Magnetics*, vol. 32, No. 1, Jan. 1996, "Spin–Valve Heads Utilizing Antiferromagnetic NiO Layers", Y. Hamakawa et al., pp. 149–155.

*Appl. Phys. Lett.*, Dec. 2, 1996, "NiMn–pinned Spin Valves with High Pinning Field Made by Ion Beam Sputtering", S. Mao et al., pp. 3593–3595.

*Journal of Magnetism and Magnetic Materials*, 1994, "Giant Magnetoresistance in Spin–Valve Multilayers", B. Dieny, pp. 335–359.

*IEEE Transactions on Magnetics*, vol. 28, No. 5, Sep. 1992, "Giant Magnetoresistance: A Primer", R. L. White, pp. 2481–2487.

U.S. Patent Application No. 08/606,625, "System for Resetting Sensor Magnetization in a Spin Valve Magnetoresistive Sensor", filed Feb. 26, 1996, Speriosu et al.

*IBM Technical Disclosure Bulletin*, vol. 30, No. 8, Jan. 1988, "Close Proximity Coupled Differential Magneto–Resistive Read Head Structure", A. W. Vinal.

RESETTABLE SYMMETRIC SPIN VALVE

BACKGROUND OF THE INVENTION

1. Field of the Invention

The present invention relates to sensors for reading magnetic flux transitions from magnetic media such as disks and tape. More particularly, the invention concerns a read sensor employing a pair of symmetric spin valves (also known as "dual" spin valves) configured so that their magnetization directions are resettable.

2. Description of the Related Art

A magnetoresistive ("MR") sensor detects magnetic field signals by measuring changes in the resistance of an MR element, fabricated of a magnetic material. Resistance of the MR element changes as a function of the strength and direction of magnetic flux being sensed by the element. Conventional MR sensors operate on the basis of the anisotropic magnetoresistive ("AMR") effect, in which a component of the element's resistance varies as the square of the cosine of the angle between the magnetization in the element and the direction of sense or bias current flow through the element.

MR sensors are useful in magnetic recording systems where recorded data is read from a magnetic medium. In particular, the external magnetic field from the recorded magnetic medium (the signal field) causes a change in the direction of the magnetization of an MR head. This in turn causes a change in electrical resistance in the MR read head and a corresponding change in the sensed current or voltage.

A variety of magnetic multilayered structures demonstrate a significantly higher MR coefficient than an AMR sensor. This effect is known as the as the giant magnetoresistive ("GMR") effect. The essential features of these structures include at least two ferromagnetic metal layers separated by a nonferromagnetic metal layer. This GMR effect has been found in a variety of systems, such as iron-chromium (FeCr) and cobalt-copper (CoCu) multilayers exhibiting strong antiferromagnetic coupling of the ferromagnetic layers. The GMR effect is also found in essentially uncoupled layered structures in which the magnetization orientation in one of the two ferromagnetic layers is fixed or pinned. The physical origin is the same in all types of GMR structures: the application of an external magnetic field causes a variation in the relative orientation of the magnetizations of neighboring ferromagnetic layers. This in turn cases a change in the spin-dependent scattering of conduction electrons and thus the electrical resistance of the structure. The resistance of the structure thus changes as the relative alignment of the magnetizations of the ferromagnetic layers changes.

One specific application of GMR is the spin valve sensor. Spin valve sensors include a nonmagnetic conductive layer called a "spacer" layer, sandwiched between "pinned" and "free" ferromagnetic layers. The magnetization of the pinned layer is pinned 90° to the quiescent magnetization of the free layer. Unlike the pinned layer, the free layer has a magnetic moment that freely responds to external magnetic fields, including those from a magnetic disk.

A spin valve sensor may be used to read data by directing a sense current through the free, spacer, and pinned layers of the sensor. The resistance of the spin valve sensor changes in proportion to rotation of the magnetic free layer (which moves freely) relative to the pinned layer (which is fixed in place). Such changes in resistance are detected and ultimately processed as playback signals.

In a typical spin valve MR sensor, the free and pinned layers have equal thicknesses, but the spacer layer is one half as thick as either of the free or pinned layers. An exemplary thickness of each of the free and pinned layers is 50 Å and an exemplary thickness of the spacer layer is 25 Å.

As mentioned above, the magnetization of the pinned layer is pinned 90° to the magnetization of the free layer. Pinning may be achieved by depositing the ferromagnetic layer to be pinned onto an antiferromagnetic layer to create an interfacial exchange coupling between the two layers. The antiferromagnetic layer may be constructed from a group of materials which include FeMn, NiMn, and NiO.

The spin structure of the antiferromagnetic layer can be aligned along a desired direction (in the plane of the layer) by heating beyond the "blocking" temperature of the antiferromagnetic layer and cooling in the presence of a magnetic field. The blocking temperature is the temperature at which the magnetic spins within a material lose their orientation. In other words, a material's blocking temperature is reached when exchange an isotropy vanishes because the local an isotropy of the antiferromagnetic layer, which decreases with temperature, has become too small to anchor the antiferromagnetic spins to the crystallographic lattice. The blocking temperatures of many antiferromagnetic materials ranges from about 160° to 200° C. Thus, when the blocking temperature of the antiferromagnetic material is exceeded, the spins of the antiferromagnetic layer lose their orientation causing the first ferromagnetic layer to no longer be pinned.

Unlike the pinned layer, the free layer has a magnetic moment that freely responds to external magnetic fields, including those from a magnetic disk. The thickness of the spacer layer is chosen to be less than the mean free path of conduction electrons through the sensor. With this arrangement, a portion of the conduction electrons are scattered by the interfaces of the spacer layer with the pinned and free layers. When the magnetizations of the pinned and free layers are parallel with respect to one another, scattering is minimal; when the magnetizations of the pinned and free layers are antiparallel, scattering is maximized. Due to changes in scattering, the resistance of the spin valve sensor changes in proportion to the cosine of the angle between the magnetizations of the pinned and free layers.

A number of U.S. patents disclose spin valve sensors. One patent, for example, shows a spin valve sensor in which at least one of the ferromagnetic layers is Co or an alloy thereof, where the magnetizations of the two ferromagnetic layers are maintained substantially perpendicular to each other at zero externally applied magnetic field by exchange coupling of the pinned ferromagnetic layer to an antiferromagnetic layer. See, e.g., U.S. Pat. No. 5,159,513, assigned to International Business Machines Corp. Another patent discloses a basic spin valve sensor where the free layer is a continuous film having a central active region and end regions. The end regions of the free layer are exchange biased by exchange coupling to one type of antiferromagnetic material, and the pinned layer by exchange coupling to a different type of antiferromagnetic material. See, e.g., U.S. Pat. No. 5,206,590.

A read head employing a spin valve sensor, called a "spin valve read head", may be combined with an inductive write head to form a "combined" head. The combined head may have the structure of either a merged head, or a piggyback head. In a merged head a single layer serves as a shield for the read head and as a first pole piece for the write head. A piggyback head has a separate layer which serves as the first pole piece for the write head. In a magnetic disk drive an air bearing surface ("ABS") of a combined head is supported adjacent a rotating disk to write information on or read information from the disk. Information is written to the rotating disk by magnetic fields which fringe across a gap between the first and second pole pieces of the write head.

To read data, a sense current is directed through the free, spacer, and pinned layers of the sensor. The resistance of the spin valve sensor changes in proportion to relative rotation of the magnetic moments of the free and pinned layers. Such changes in resistance are detected and ultimately processed as playback signals.

Known spin valve sensors provide a number of benefits, most notably their significantly higher MR coefficient in comparison to AMR sensors. However, spin valves are sensitive to heating, which may even disorient the magnetic spins in both antiferromagnetic and ferromagnetic films of the spin valve. This occurs whenever the heat source exceeds the blocking temperature of the antiferromagnetic films.

The chief sources of this level of heat are electrostatic discharge and electrostatic overstress. These temperatures can be reached by certain thermal effects during operation of the disk drive, such as an increase in the ambient temperature inside the drive, heating of the spin valve sensor due to the bias current, and rapid heating of the spin valve sensor due to the head carrier contacting asperities on the disk. In addition, magnetic disk drives are especially vulnerable to electrostatic discharge during the manufacturing process, such as during fabrication and assembly. If any of these thermal effects cause the spin valve sensor to exceed the antiferromagnet's blocking temperature, the magnetization of the pinned layer will no longer be pinned in the desired direction. This changes the spin valve sensor's response to an externally applied magnetic field, resulting in errors in data read from the disk.

A number of precautions can be taken to avoid the dangers of heat-induced magnetic disorientation. For example, manufacturing personnel can take special precautions such as electrically grounding themselves and their workpieces. Nonetheless, damage to spin valve sensors still occurs under some circumstances. Electric over stress can change pinned layer magnetization orientation. This is due to the fact that the heating by the current raises the temperature of the head near to the blocking temperature. Since the exchange field drops to near zero around the blocking temperature, antiferromagnetic layer spins around a neighboring ferromagnetic layer (pinned layer) magnetization will assume the direction of the field generated by the current. However, the field from the sense current is only of limited value (around only about 20 Oe). Therefore, if the pinned layer has coercivity in addition to the exchange field, and if the coercivity value is larger than the field from the current, then the field from the current will not be able to properly orient the pinned layer magnetization. Coercivity, in contrast to the exchange field, does not drop so strongly with temperature; as a result, coercivity can be fairly high, even at elevated temperatures. In addition, since the field from the current is non-uniform over the active area of the sensor it does not set the magnetization of the pinned layer over the entire pinned layer. As a result of these factors, electric overstress can severely diminish or disable the functionality of a spin value sensor.

SUMMARY OF THE INVENTION

Broadly, the present invention concerns a read sensor employing symmetric spin valves with resettable magnetization directions. The symmetric spin valves include first and second spin valves. The first spin valve includes an antiferromagnetic layer having a magnetic spin structure aligned in a first direction. Abutting the first spin valve's antiferromagnetic layer is a ferromagnetic pinned layer, whose magnetization direction is pinned parallel to the first direction by the first spin valve's antiferromagnetic layer. Upon the first spin valve's ferromagnetic layer lies a non-magnetic conductor layer, then a ferromagnetic free layer. The ferromagnetic free layer is also shared by the second spin valve.

Abutting the shared ferromagnetic free layer is a non-magnetic conductor layer of the second spin valve. Adjacent the second spin valve's non-magnetic conductor layer lies a pair of ferromagnetic pinned layers sandwiching an exchange coupling layer therebetween. These pinned layers include an inner layer and a second outer layer. The exchange coupling layer exhibits sufficient exchange coupling with the adjacent ferromagnetic pinned layers to pin magnetization directions of the ferromagnetic layers in opposite directions. Optionally, the second spin valve may include a second antiferromagnetic layer provided upon the second spin valve's ferromagnetic pinned layer.

Thus, as described above, one aspect of the invention comprises an apparatus such as a read sensor or a magnetic storage system employing such a read sensor. However, the invention has a number of different aspects as well. For instance, another aspect of the invention concerns a method of configuring the magnetization of a read sensor with symmetric spin valves. According to one embodiment, a current pulse is directed through the spin valve in an initialization direction. The current flows primarily in the conductors and intervening layer. The current pulse has sufficient duration and magnitude to heat the antiferromagnetic layers above their blocking temperatures thereby freeing any prior magnetic orientation of the antiferromagnetic layers. The read sensor reacts to the magnetic field of the current pulse by orienting the magnetic spin structure of the various antiferromagnetic and ferromagnetic layers in a chain reaction.

In particular, the magnetic field of the current pulse sets the magnetization direction of the first spin valve's antiferromagnetic layer in a first direction perpendicular to the initialization direction. Likewise, the magnetic field of the current pulse sets the magnetization direction of the second spin valve's antiferromagnetic layer in a direction perpendicular to initialization direction, antiparallel to the first direction. Then, the establishment of the magnetization direction of the first spin valve's antiferromagnetic layer pins the adjacent first spin valve's ferromagnetic pinned layer with a magnetization direction parallel to the first direction. Likewise, the establishment of the second spin valve's antiferromagnetic layer's magnetization direction pins the magnetization direction of the second spin valve's outer ferromagnetic pinned layer antiparallel to the first direction. Moreover, as a result of pinning the magnetization direction of the second spin valve's outer ferromagnetic pinned layer, the second spin valve's inner ferromagnetic pinned layer is pinned with a magnetization direction parallel to the first direction. This occurs due to the exchange coupling between these layers, provided by the intervening exchange coupling layer.

The invention affords its users with a number of distinct advantages. Chiefly, the invention provides a read sensor with a symmetric spin valve that is resettable. Unlike prior symmetric spin valves, applying a suitable current pulse to the read sensor of the present invention sets the magnetization directions of the pinned ferromagnetic layers in the proper phase. Thus, in contrast to prior symmetric spin valves that cancel each other's output signal after being reset, the symmetric spin valves of the invention cooperatively provide double the output of a single spin valve. The invention is particularly beneficial because it enables a spin valve sensor to be reset after inadvertent exposure to high temperatures during manufacturing process or other times. The invention also provides a number of other benefits, as shown below.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

HARDWARE COMPONENTS & INTERCONNECTIONS

Spin Valve Sensor—Materials

Figure 1:
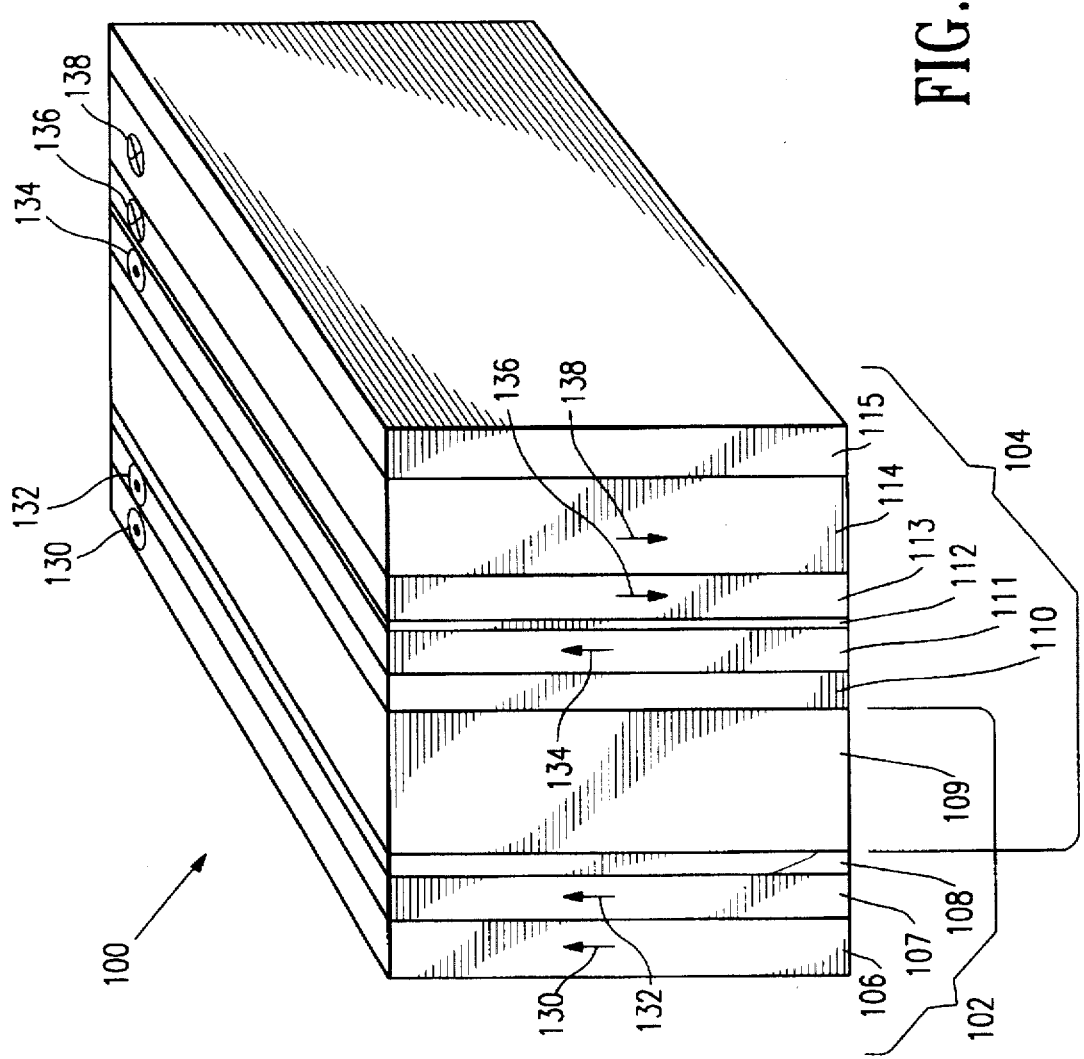
FIG. 1 is a cross-sectional perspective view of a dual spin valve read sensor according to the invention.
Figure 2:
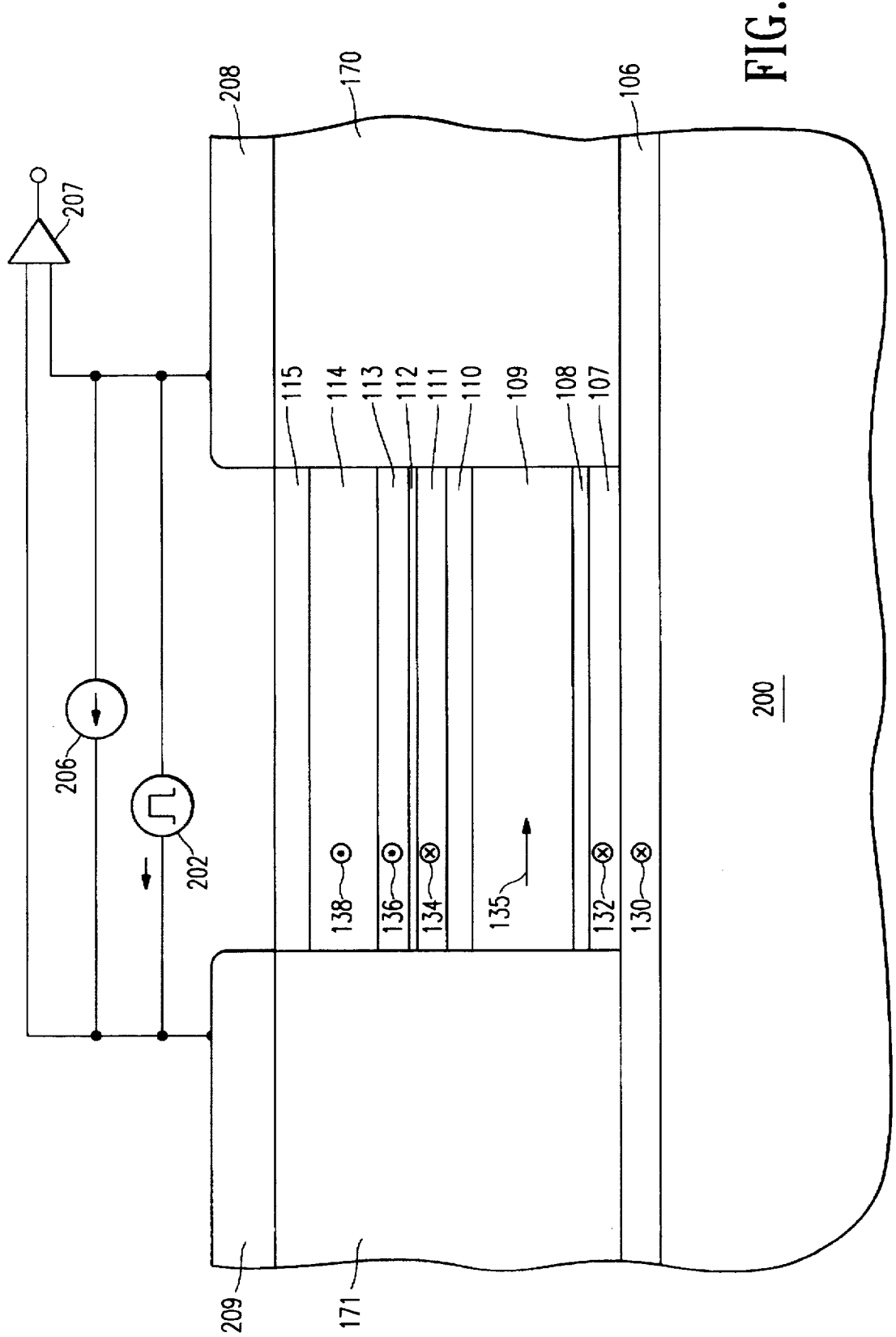
FIG. 2 is a cross-sectional plan view of the dual spin valve read sensor of the invention, also depicting application of sense currents, bias current, and voltage measurement.

One aspect of the invention concerns a read sensor employing symmetric spin valves with resettable magnetization directions. FIG. 1 shows the hardware components and interrelationships of an exemplary embodiment of this sensor. In particular, a sensor 100 includes a number of substantially parallel layers. The sensor 100 is preferably positioned at the deposit end of a slider (not shown) proximate an air bearing surface (not shown) of the slider. The location of the sensor 100 within a slider is performed without difficulty by an ordinarily skilled artisan having the benefit of this disclosure, in view of the substantial amount of known information concerning the position of magnetoresistive sensors in sliders. FIG. 2, discussed below, depicts the components of the sensor 100 with relation to a substrate 200.

Referring to FIG. 1, the sensor 100 includes a pair of spin valves 102, 104, each having multiple layers. As an example, the layers may be formed upon each other by deposition. The spin valves 102/104 share one layer 109 in common, as discussed in greater detail below.

First Spin Valve

The spin valve 102 includes an antiferromagnetic layer 106, a ferromagnetic pinned layer 107, a conductor layer 108, and a ferromagnetic free layer 109. Adjacent layers preferably lie in direct atomic contact with each other.

The first antiferromagnetic layer 106 comprises an antiferromagnetic layer of suitable material and thickness for use as an antiferromagnetic layer in spin valves, e.g., about 400 Å of NiO. The ferromagnetic pinned layer 107 comprises a ferromagnetic substance of suitable material and thickness for application in spin valves, e.g., about 10–40 Å of Co. The conductor layer 108 comprises a conductive substance of suitable material and thickness for application in spin valves, e.g., about 20–30 Å of Cu, Au, or Ag. The ferromagnetic free layer 109 comprises a substance of suitable material and thickness for use as a free layer in spin valves, e.g., about 30–150 Å of NiFe, Co, or NiFeCo. Preferably, the material of the free layer 109 has sufficient magnetic softness magnetic coercivity less than 10 Oe, low magnetic isotropy, and high permeability.

Second Spin Valve

In addition to the ferromagnetic free layer 109, the second spin valve 104 includes a conductor layer 110, an inner ferromagnetic pinned layer 111, an exchange coupling layer 112, and an outer ferromagnetic pinned layer 113. In the illustrated embodiment, a second antiferromagnetic layer 114 is also shown, although this layer may be omitted without departing from the scope of this invention. Optionally, a protective overlayer 115 may be provided to protect the sensor 100 components. The overlayer 115, if implemented, lies atop the antiferromagnetic layer 114 (as illustrated), or atop the outer ferromagnetic pinned layer 113 (if the antiferromagnetic layer 114 is omitted).

The conductor layer 110 comprises a substance of suitable material and thickness for spin valves, e.g., about 20–30 Å of Cu. The ferromagnetic pinned layers 111/113 each comprise a suitable type and thickness of material for use in spin valves, e.g., about 10–40 Å of Co. The exchange coupling layer 112 comprises a metallic, non-magnetic material that provides strong antiferromagnetic exchange coupling, e.g., about 4–8 Å of Ru. The second antiferromagnetic layer 114 is made of a suitable thickness and type of antiferromagnetic material for spin valve applications, such as 150 Å of FeMn. Preferably, the protective overlayer 115 (if used) comprises Ta or another suitable material with a high resistivity and sufficient thickness to protect the underlying layers from chemicals used in processing, oxidation, contamination, and from other damage as well. The overlayer 115 may be about 30–50 Å thick, as an example.

Spin Valve Sensor—Magnetization

The sensor 100 exhibits a predefined magnetization. Magnetization of the sensor 100, including the ferromagnetic layers 107/109/111/113, is performed in accordance with the invention. The sensor 100 may be magnetized prior to initial operation, such as during the fabrication or assembly processes. Or, the sensor 100 may be magnetized after some period of operating the sensor 100, if the sensor 100 loses its magnetic orientation due to a traumatic high temperature event such as electrostatic discharge. A process for the magnetization of the sensor 100 is discussed in greater detail below.

Whether magnetized before or after initial operation of the sensor 100, the magnetized components of the sensor 100 are ultimately given the same magnetic configuration. In particular in the first spin valve 102, the antiferromagnetic layer 106 has a magnetic orientation in a direction 130. For ease of explanation, conventional directional shorthand is used herein, where a circled dot indicates a direction coming out of the plane of the page (like an arrow's head), and a circled "x" indicates a direction going into the page (like an arrow's tail). The neighboring ferromagnetic pinned layer 107 has a magnetic moment pinned in a direction 132, due to exchange coupling with the neighboring antiferromagnetic layer 106. As the magnetization of the free layer 109 is "free" to move about, this layer is not pinned in any particular direction.

In the second spin valve 104, the antiferromagnetic layer 114 has a magnetic orientation in a direction 138. The neighboring ferromagnetic pinned layer 113 has its magnetic moment pinned in a parallel direction 136, due to exchange coupling with the antiferromagnetic layer 114. The magnetization direction of the second spin valve's inner ferromagnetic layer 111 is pinned in a direction 134. This occurs because the exchange coupling layer 112 holds the magnetization direction of the second spin valve's inner ferromagnetic pinned layer 111 antiparallel to the second spin valve's outer ferromagnetic pinned layer 113.

The sensor 100 also includes hard bias layers 170–171, which serve to provide the ferromagnetic free layer 109 with a quiescent magnetization in a direction 135. The hard bias layers 170–171 preferably comprise a material with high coercivity, such as CoPtCr.

Electrical Current in the Spin Valve

The sensor 100 may also include various accessories to direct electrical current through the sensor 100. A small but constant sense current, for example, is directed through the sensor 100 to sense the change in resistance provided by the GMR effect. At different times, a relatively large current pulse is directed through the sensor 100 to establish the magnetization direction of the sensor 100. FIG. 2 depicts the sensor 100 in relation to the various features that help direct current through the sensor 100. The view of FIG. 2 is taken from an air bearing surface of the sensor 100.

The sensor 100 is attached to a pair of complementary leads 208–209 to facilitate electrical connection to various electrical components. The leads 208–209 preferably comprise 500 Å of Ta with a 50 Å underlayer of Cr, or another suitable thickness and type of conductive material. The attachment of leads to magnetoresistive sensors and spin valves is a well known technique, familiar to those of ordinary skill in the art.

The leads 208–209 also provide connection between the sensor 100 and a pulse current source 202 to direct a magnetically orienting electrical pulse current through the sensor 100, as described in greater detail below. Additionally coupled to the leads 208–209 is a sense current source 206, described in greater detail below.

Establishing Magnetization Direction

During ongoing operation of the sensor 100, the pulse current source 202 directs electrical current to the sensor 100. The current flows through the layers 106–115. As explained in greater detail below, the pulse current heats the antiferromagnetic layers 106/114 past their blocking temperatures, thereby freeing the magnetic orientation of these layers. The pulse current also provides a specific magnetization orientation for the antiferromagnetic layers 106/114 as well as the ferromagnetic pinned layers 107/111/113, as described in greater detail below. This function is performed by the magnetic field created by the pulse current. In contrast, heating of the antiferromagnetic layers 106/114 is achieved by the heat generated by the pulse current.

To satisfy the foregoing purposes, the pulse current source 202 comprises a suitable device to provide a current pulse of sufficient amplitude and duration to bring the antiferromagnetic layers 106/114 past their blocking temperatures, and to provide an external magnetic field sufficient to bias the layers 106/107/111/113/114 as desired. As an example, the pulse current may comprise a 17–18 mA signal lasting for about 50–150 nanoseconds.

It is emphasized that ordinarily skilled artisans having the benefit of this disclosure will recognize that certain changes may be made to the biasing and pinning of the various sensor components without departing from the scope of this invention. Furthermore, more particular information is provided below concerning the particular manner and effect of biasing the sensor 100.

Sense Current

During ongoing operation of the sensor 100, the sense current source 206 directs a small, constant sense current through the sensor 100 via the leads 208–209. As an example, the sense current may be about 4–10 mA. Chiefly, the sense current provides means to detect changes in resistance provided by the GMR effect. To satisfy the foregoing purposes, the sense current source 206 preferably comprises a suitable current generating device to provide a substantially constant current of about 4–10 mA D.C.

It is emphasized that ordinarily skilled artisans having the benefit of this disclosure will recognize that certain changes may be made to the magnetization, biasing, and current flow occurring in the various sensor components without departing from the scope of the invention. Furthermore, more particular explanation is provided below concerning the particular manner and effect of biasing the spin valves 102/104.

Output Sensing

As mentioned above, resistance of the sensor 100 changes during the detection of an external magnetic field. Other circuitry, discussed below, quantifies this change in resistance to generate a "playback" signal representative of the detected magnetic flux transitions.

Namely, the resistance of the sensor 100 is determined by measuring the voltage drop across the leads 208–209, and dividing this voltage by the sense current. To measure the voltage drop, the leads 208–209 may be coupled to an output sensor 207 such as a differential amplifier or another appropriate voltage sensor. Alternatively, a sense voltage may be placed across the leads 208–209, with measurement taken of the resultant current therebetween.

Magnetic Disk Storage System

As mentioned above, the sensor 100 is preferably implemented in a slider of a read/write head. In an exemplary implementation, the head may be part of a magnetic disk storage system, such as the exemplary magnetic disk storage system 300 shown in FIG. 3. Ordinarily skilled artisans will recognize, however, that invention is also applicable to other magnetic recording systems than the specific embodiment 300 illustrated in FIG. 3.

Figure 3:
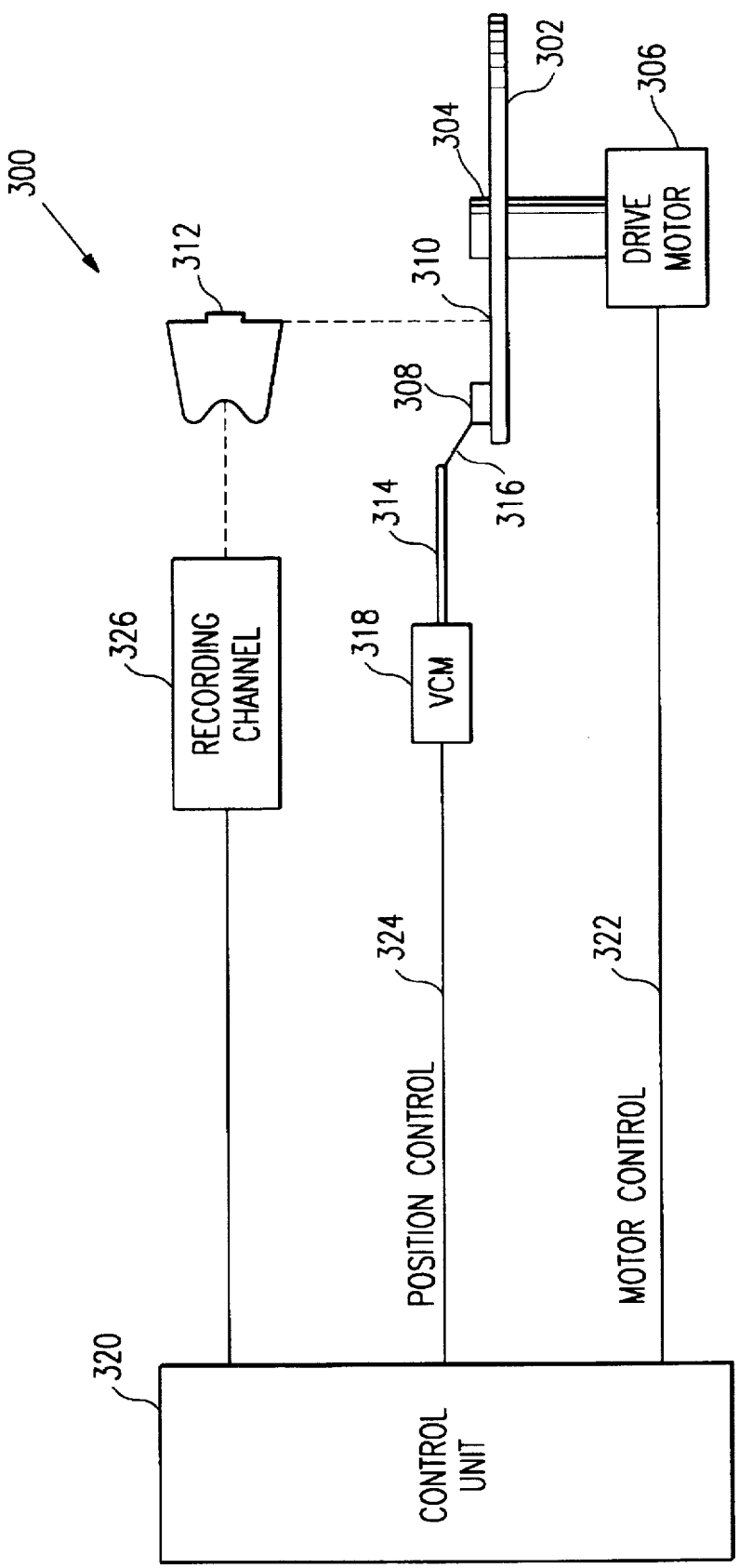
FIG. 3 is a block diagram of a magnetic disk storage system according to the invention.

The magnetic disk storage comprises at least one rotatable magnetic disk 302 is supported on a spindle 304 and rotated by a disk drive motor 306 with at least one slider 308 positioned on the disk 302, each slider 308 supporting one or more magnetic read/write heads. The magnetic recording media on each disk is in the form of an annular pattern of concentric data tracks (not shown) on the disk 302. As the disk 302 rotates, the sliders 308 are moved radially in and out over the disk surface 310 so that the heads 312 may access different portions of the disk where desired data is recorded. Each slider 308 is attached to an actuator aim 314 by means of a suspension 316. The suspension 316 provides a slight spring force which biases the slider 308 against the disk surface 310. Preferably, the actuator arm 314, suspension 316, and slider 308 are embodied in an integrated suspension assembly constructed in accordance with the invention, such as ones of the various embodiments described in detail above. Each actuator arm 314 is attached to an actuator means 318. The actuator means 318 as shown in FIG. 3 may be a voice coil motor ("VCM"), for example. The VCM comprises a coil moveable within a fixed magnetic field, the direction and velocity of the coil movements being controlled by the motor current signals supplied by a controller. During operation of the disk storage system, the rotation of the disk 302 generates an air bearing between the slider 308 and the disk surface 310 which exerts an upward force or lift on the slider. The air bearing thus counterbalances the slight spring force of the suspension 316 and supports the slider 308 off and slightly above the disk surface by a small, substantially constant spacing during operation.

The various components of the disk storage system are controlled in operation by control signals generated by control unit 320, such as access control signals and internal clock signals. Typically, the control unit 320 comprises logic control circuits, storage means and a microprocessor, for example. The control unit 320 generates control signals to control various system operations such as drive motor control signals on line 322 and head position and seek control signals on line 324. The control signals on line 324 provide the desired current profiles to optimally move and position a selected slider 308 to the desired data track on the associated disk 302. Read and write signals are communicated to and from read/write heads 312 by means of recording channel 326.

The above description of a typical magnetic disk storage system, and the accompanying illustration of FIG. 3 are for representation purposes only. Ordinarily skilled artisans will recognize, for example, that disk storage systems may contain a large number of disks and actuators, and each actuator may support a number of sliders.

OPERATION

Figure 4:
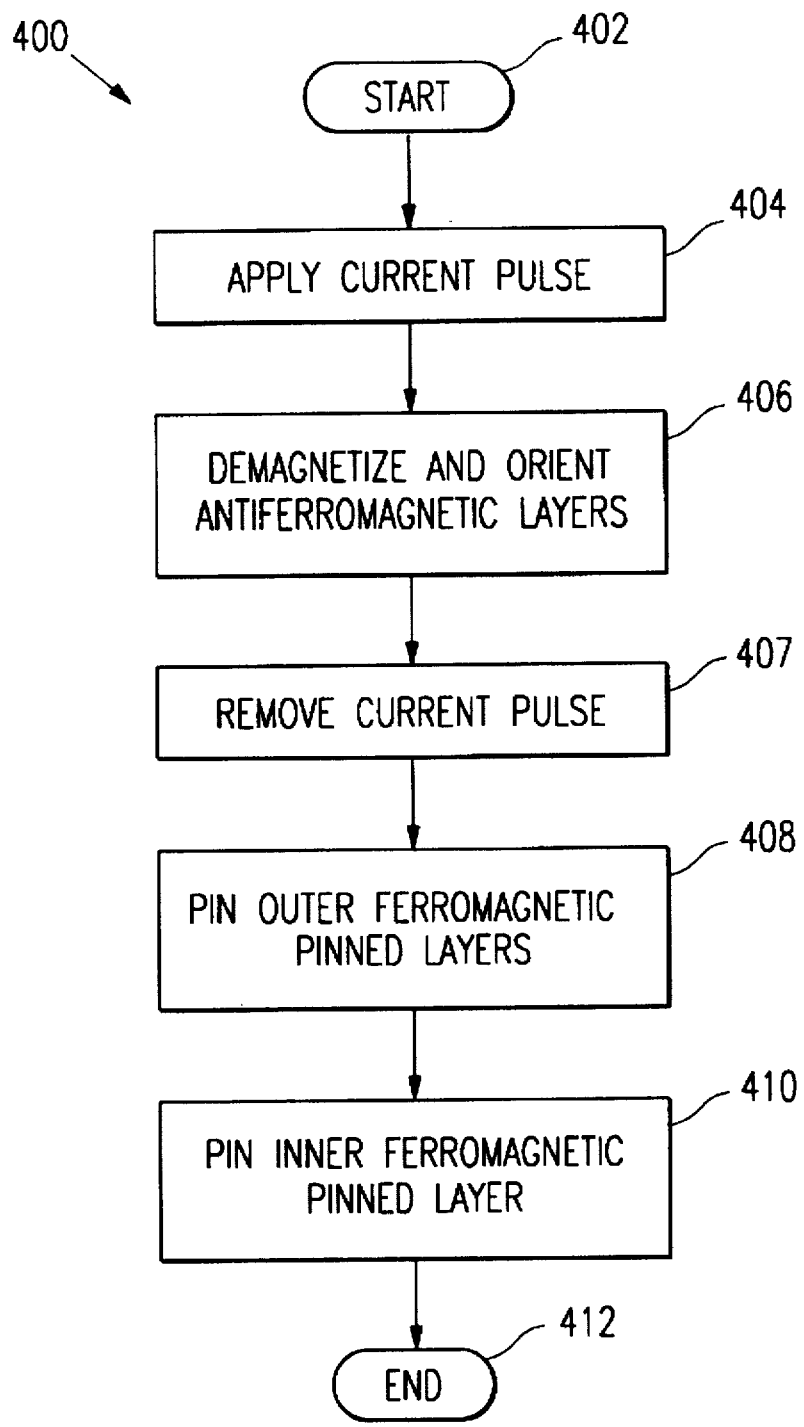
FIG. 4 is a flowchart illustrating a sequence of operational steps for configuring one embodiment of dual spin valve read sensor according to the invention.

In addition to the various hardware embodiments described above, a different aspect of the invention concerns a method for configuring a symmetric spin valve sensor.
Operational Sequence FIG. 4 depicts a sequence of method steps 400 to illustrate one example of the method aspect of the present invention. For ease of explanation, but without any limitation intended thereby, the example of FIG. 4 is described in the context of the sensor 100 and the associated components described above in FIGS. 1-3.

As shown, the routine 400 is useful to initially establish the magnetic configuration of the sensor 100 during fabrication, assembly, or another stage of the manufacturing process. The routine 400 is also useful for resetting the magnetic configuration of the sensor 100 after the sensor 100 experiences a disorienting high temperature event such as a transient voltage from electrostatic discharge. The steps 400 begin in task 402.
Applying Pulse Current In task 404, the pulse current source 202 directs a pulse of electrical current through the layers sensor 100 via the leads 208-209. This current flows in the conductor layers 107-115. As mentioned above, the current pulse has sufficient amplitude and duration to heat the antiferromagnetic layers 106/114 past their blocking temperatures, thereby freeing the magnetic orientations of these layers as well as the associated ferromagnetic pinned layers 107/113. As an example, the current pulse may comprise a rectangular wave pulse, lasting for about 50-150 nanoseconds, and containing about 17-18 mA. The current pulse may instead comprise a multi-amplitude rectangular pulse or another suitable shape, as recognized by ordinarily skilled artisans having the benefit of this disclosure.
Orienting Antiferromagnetic Films Application of the pulse current heats the antiferromagnetic layers 106/114 past their blocking temperatures in task 406, thereby freeing their magnetic orientations. In addition to heat, the current pulse also provides a magnetic field that magnetically orients the antiferromagnetic layers 106/114 in the respective directions 130/138, in accordance with the well known "right-hand rule" of electromagnetics.

The pulse current lasts sufficiently long to both remove any magnetic orientation of the antiferromagnetic layers 106/114 and also re-orient the layers 106/114 in accordance with the magnetic field created by the flowing current. In the illustrated example, where the pulse current flows in the direction from the lead 208 to the lead 209, the magnetic field of the current pulse biases the antiferromagnetic layers 106/114 in the directions 130/138, respectively. After task 406, the current pulse may be discontinued as shown in task 407. Application of the current pulse is not necessary to orient the ferromagnetic films, which occurs in the following steps.
Pinning Outer Ferromagnetic Pinned Layers As shown by task 408, the magnetic orientation of the antiferromagnetic layers 106/114 has the effect of "pinning" the magnetization directions of the ferromagnetic pinned layer 107/113. This occurs because of the strong exchange coupling between each antiferromagnet-ferromagnet pair. More particularly, the antiferromagnetic layer 106 pins the ferromagnetic pinned layer 107 in the direction 132, parallel to its own direction 130. Similarly, the antiferromagnetic layer 114 pins the second spin valve's outer ferromagnetic pinned layer 113 in the direction 136, parallel to its own direction 138.
Pining Inner Ferromagnetic Pinned Layer As shown by task 410, the pinning of the second spin valve's outer ferromagnetic pinned layer 113 has the effect of pinning the second spin valve's inner ferromagnetic pinned layer 111. This occurs because the layer 112 provides a substantial exchange coupling between the matched ferromagnetic layers 111/113. Because of this exchange coupling, then, the magnetic orientation of the second spin valve's inner ferromagnetic pinned layer 111 is aligned with the direction 134, antiparallel to the direction 136 of the counterpart ferromagnetic pinned layer 113.

Thus, as shown by the foregoing description, the process 400 is able to set the magnetization of both spin valves of a symmetric spin valve sensor, unlike the previous techniques. After task 410, the routine 400 ends in task 412.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

Figure 6:
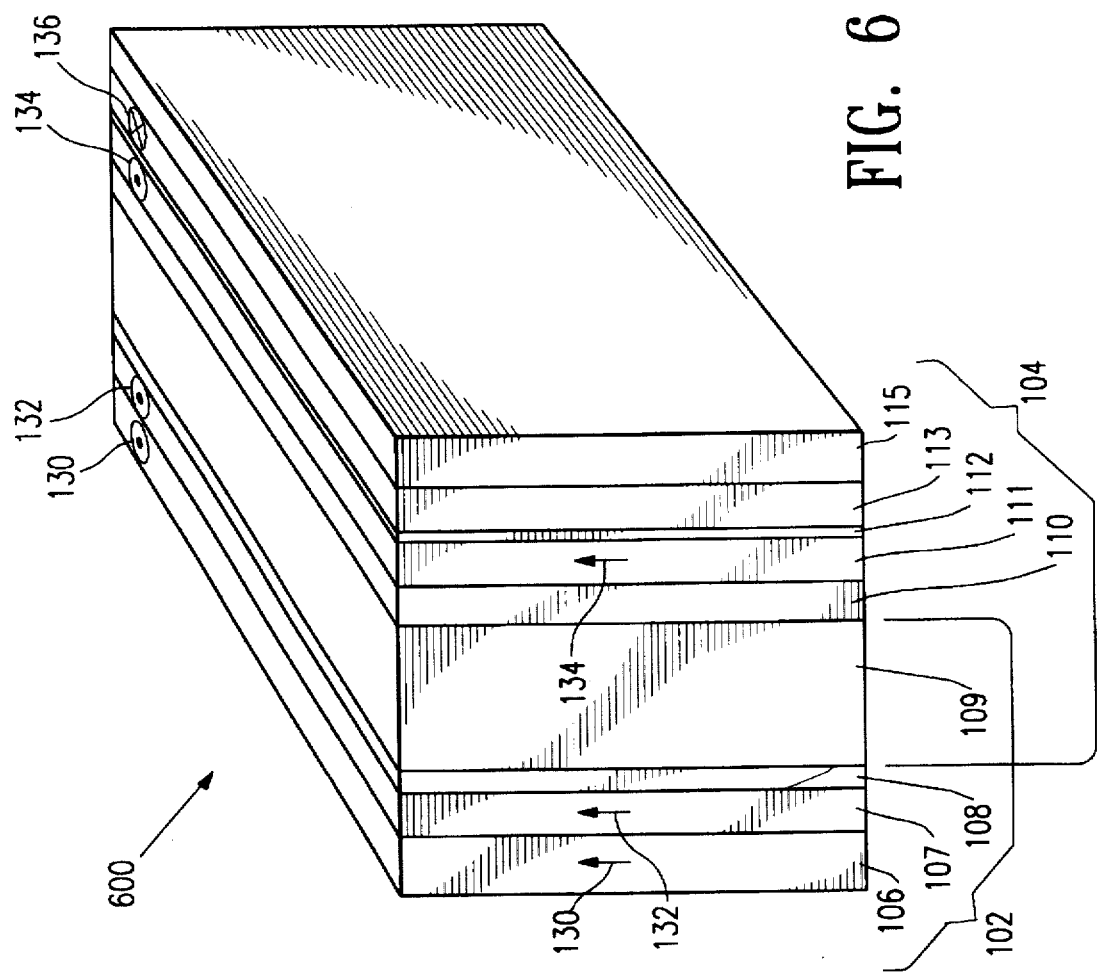
FIG. 6 is a cross-sectional plan view of an alternative embodiment of dual spin valve read sensor according to the invention.

The following provides an example of one such alternative embodiment.
Alternative Sensor Construction One alternative to the foregoing construction of the sensor 100 is the sensor 600, which omits the second antiferromagnetic layer 114 as shown in FIG. 6. Without the layer 114, the operation of the sensor 600 to sense magnetic flux transitions is unimpeded because the resistance of the spin valve 104 is still determined by the magnetic relationship between the free layer 109 and adjacent the ferromagnetic pinned layers 111/107, irrespective of the presence of the antiferromagnetic layer 114.

Although operation of the modified sensor 600 is unchanged by removal of the antiferromagnetic layer 114, the sensor's construction is different to facilitate magnetic orientation of the modified sensor 600. Namely, to facilitate magnetic configuration of the sensor 600, the ferromagnetic pinned layers 111/113 preferably have uneven thicknesses. This is beneficial for pinning the layers 111/113 without the presence of the antiferromagnetic layer 114, as discussed more specifically below. According to one embodiment, the difference in thicknesses may be about 10 Å.

Alternative Magnetic Configuration Sequence

Figure 5:
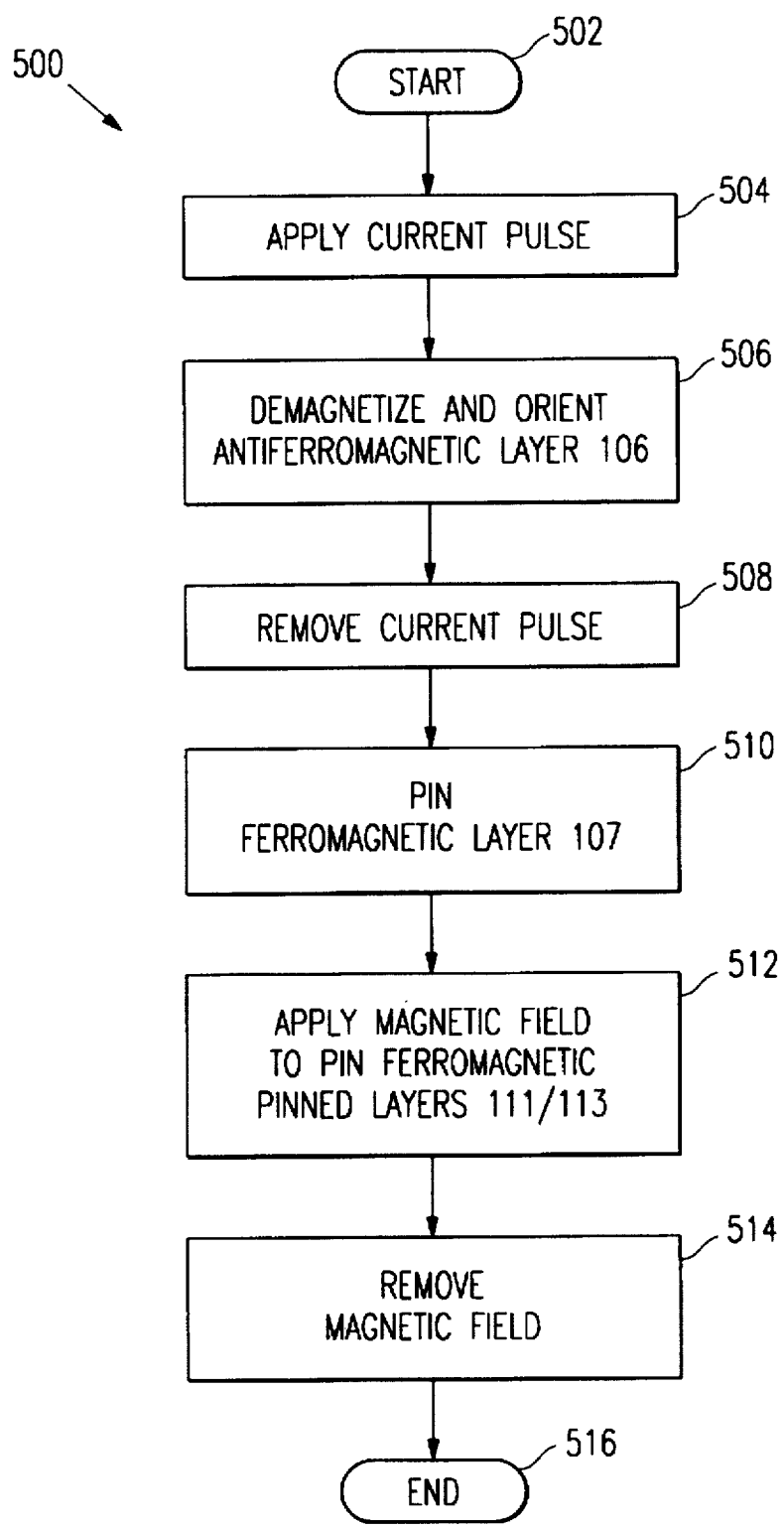
FIG. 5 is a flowchart illustrating a sequence of operational steps for configuring a different embodiment of dual spin valve read sensor according to the invention.
Figure 7:
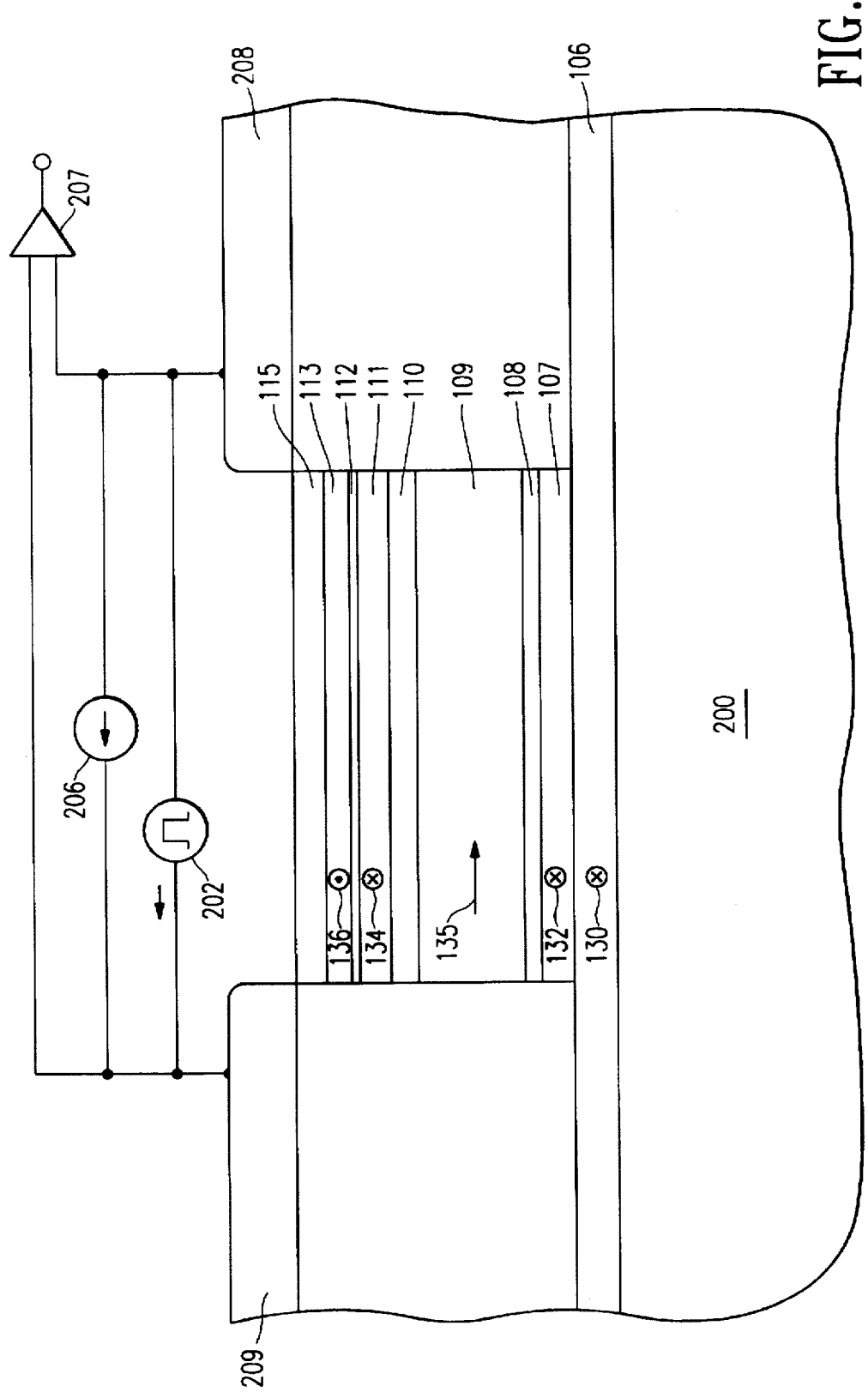
FIG. 7 is a cross-sectional plan view of the alternative embodiment of dual spin valve read sensor of the invention, depicting application of sense currents, bias current, and voltage measurement.

As mentioned above, omission of the antiferromagnetic layer 114 requires a different process to magnetically orient the modified sensor 600. FIG. 5 depicts one exemplary sequence 500 to configure the sensor 600 where the antiferromagnetic layer 114 has been omitted. The example of FIG. 5 is described in the context of the modified sensor and the associated components described in FIGS. 6–7. The sensor 600 discussed in the following example omits the antiferromagnetic layer 114, and includes pinned layers 111/113 of uneven thickness.

Applying Pulse Current

After the sequence 500 begins in task 502, the pulse current source 202 in task 504 directs a pulse of electrical current through the sensor 600 via the leads 208–209. This current flows in the layers 106–115. The current pulse has sufficient amplitude and duration to bring the antiferromagnetic layer 106 past its blocking temperature, thereby freeing the magnetic orientation of this layer as well as the associated ferromagnetic pinned layer 107. As an example, the current pulse may comprise a rectangular wave pulse, lasting for about 50–150 nanoseconds, and containing about 17–18 mA. The current pulse may instead comprise a multi-amplitude rectangular pulse or another suitable shape, as recognized by ordinary skilled artisan having the benefit of this disclosure.

Orienting Antiferromagnetic Films

Application of the pulse current heats the antiferromagnetic layer 106 past its blocking temperature in task 506, thereby freeing its magnetic orientation. In addition to heat, the current pulse also provides a magnetic field that magnetically orients the antiferromagnetic layer 106 in the direction 130, in accordance with the well known "right-hand rule" of electromagnetics.

The pulse current lasts sufficiently long to both remove any magnetic orientation of the antiferromagnetic layer 106 and also re-orient the layer 106 in accordance with the magnetic field created by the flowing current. In the illustrated embodiment, where the pulse current flows in the direction from the lead 208 to the lead 209, the magnetic field of the current pulse biases the antiferromagnetic layer 106 in the direction 130. After task 506, the current pulse may be discontinued as shown in task 508. Application of the current pulse is not necessary to orient the ferromagnetic films, which occurs in the following steps.

Pinning the Ferromagnetic Layer 107

As shown by task 510, the magnetic orientation of the antiferromagnetic layer 106 has the effect of "pinning" the magnetization direction of the neighboring outer ferromagnetic pinned layer 107. This occurs because of the strong exchange coupling between the layers 106–107. More particularly, the antiferromagnetic layer 106 pins the ferromagnetic pinned layer 107 in the direction 132, parallel to its own direction 130.

Pinning Ferromagnetic Layers 111/113

Unlike the sequence 400 shown above, the ferromagnetic layers 111/113 cannot be pinned by the antiferromagnetic layer 114, since this layer is missing from the presently illustrated embodiment. As shown in task 512, however, the layers 111/113 are easily pinned by applying an external magnetic field in one of the directions 134/136. The external magnetic field (not shown) preferably comprises a uniform magnetic field of sufficient field strength, e.g., 4.5 KOe. This field may be generated, for example, by an electromagnet or another magnetic source adequate to provide the necessary field.

Due to the uneven thicknesses of the layers 111/113, the thicker one of the layers 111/113 responds more strongly to the applied magnetic field. This thicker layer therefore orients itself with the external magnetic field. The remaining (thinner) layer necessarily orients itself antiparallel to the thicker layer, due to the high antiferromagnetic exchange coupling provided by the exchange coupling layer 112.

Thus, to ensure that the layers 111/113 are magnetically oriented in directions 134/136 (respectively), the following arrangement is preferably used. As illustrated, the layer 113 may be thinner than the layer 111. With this arrangement, the magnetic field of task 512 is applied in the direction 134. Alternatively (not shown), the layer 113 may be thicker than the layer 111, with the external magnetic field being applied in task 512 in the direction 136.

After task 512 establishes the magnetizations of the ferromagnetic pinned layers 111/113, task 514 removes the external magnetic field, and the routine 500 ends in task 514. As shown by the foregoing description, then, the process 500 is able to set the magnetization of both spin valves of a symmetric spin valve sensor, unlike previously known techniques.

What is claimed is:

1. An apparatus for reading data, comprising:
    a first antiferromagnetic layer having magnetic spin structure aligned in a first direction;
    a first ferromagnetic pinned layer abutting the first antiferromagnetic layer and having a magnetization direction pinned parallel to the first direction by the first antiferromagnetic layer;
    a first non-magnetic conductor layer abutting the first antiferromagnetic layer;
    a ferromagnetic free layer abutting the first non-magnetic conductor layer;
    a second non-magnetic conductor layer abutting the ferromagnetic free layer;
    a second ferromagnetic pinned layer abutting the second non-magnetic conductor layer and having a magnetization direction pinned parallel to the first direction;
    an exchange coupling layer abutting the second ferromagnetic layer; and
    a third ferromagnetic pinned layer abutting the exchange coupling layer and having a magnetization direction pinned antiparallel to the first direction;
    the exchange coupling layer exhibiting a predetermined level of exchange coupling with the second and third ferromagnetic pinned layers sufficient to pin magnetization directions of the second and third ferromagnetic pinned layers in antiparallel directions relative to each other.

2. The apparatus of claim 1, the first antiferromagnetic layer comprising NiO.

3. The apparatus of claim 1, the ferromagnetic pinned layers each comprising Co.

4. The apparatus of claim 1, the conductor layers each comprising Cu.

5. The apparatus of claim 1, the ferromagnetic free layer comprising NiO.

6. The apparatus of claim 1, the exchange coupling layer comprising Ru.

7. The apparatus of claim 1, further comprising a second antiferromagnetic layer abutting the third ferromagnetic pinned layer, the second antiferromagnetic layer having a magnetic spin structure aligned antiparallel to the first direction.

8. The apparatus of claim 7, the second antiferromagnetic layer comprising FeMn.

9. The apparatus of claim 7, the second antiferromagnetic layer comprising NiO.

10. A magnetic storage system, comprising:
   a magnetic storage medium having a plurality of tracks for recording data; and
   a suspension assembly including:
      a disk access arm mounted in a predetermined relationship to the magnetic storage medium, the arm having a distal end and a proximal end; and
      a read head mounted to the arm proximate the distal end, said read head including a dual spin valve sensor that comprises:
         a first antiferromagnetic layer having magnetic spin structure aligned in a first direction;
         a first ferromagnetic pinned layer abutting the first antiferromagnetic layer and having a magnetization direction pinned parallel to the first direction by the first antiferromagnetic layer;
         a first non-magnetic conductor layer abutting the first antiferromagnetic layer;
         a ferromagnetic free layer abutting the first non-magnetic conductor layer;
         a second non-magnetic conductor layer abutting the ferromagnetic free layer;
         a second ferromagnetic pinned layer abutting the second non-magnetic conductor layer and having a magnetization direction pinned parallel to the first direction;
         an exchange coupling layer abutting the second ferromagnetic layer;
         a third ferromagnetic pinned layer abutting the exchange coupling layer and having a magnetization direction pinned antiparallel to the first direction; and
         the exchange coupling layer exhibiting a predetermined level of exchange coupling with the second and third ferromagnetic pinned layers sufficient to pin magnetization directions of the second and third ferromagnetic pinned layers in antiparallel directions relative to each other.

11. The system of claim 10, the first antiferromagnetic layer comprising NiO.

12. The system of claim 10, the ferromagnetic pinned layers each comprising Co.

13. The system of claim 10, the conductor layers each comprising Cu.

14. The system of claim 10, the ferromagnetic free layer comprising NiO.

15. The system of claim 10, the exchange coupling layer comprising Ru.

16. The system of claim 10, further comprising a second antiferromagnetic layer abutting the third ferromagnetic pinned layer, the second antiferromagnetic layer having a magnetic spin structure aligned antiparallel to the first direction.

17. The system of claim 16, the second antiferromagnetic layer comprising FeMn.

18. The system of claim 16, the second antiferromagnetic layer comprising NiO.

19. The system of claim 10, the magnetic storage medium comprising a disk medium.

20. A method for biasing a dual spin valve sensor that comprises:
   a first antiferromagnetic layer having a blocking temperature;
   a first ferromagnetic pinned layer abutting the first antiferromagnetic layer;
   a first non-magnetic conductor layer abutting the first antiferromagnetic layer;
   a ferromagnetic free layer abutting the first non-magnetic conductor layer;
   a second non-magnetic conductor layer abutting the ferromagnetic free layer;
   a second ferromagnetic pinned layer abutting the second non-magnetic conductor layer;
   an exchange coupling layer abutting the second ferromagnetic layer;
   a third ferromagnetic pinned layer abutting the exchange coupling layer;
   the exchange coupling layer exhibiting a predetermined level of exchange coupling between the second and third ferromagnetic pinned layers sufficient to pin magnetization directions of the second and third ferromagnetic pinned layers in relatively antiparallel directions;
   a second antiferromagnetic layer abutting the third ferromagnetic pinned layer and having a blocking temperature;

said method comprising:
   directing a current pulse through at least one of the conductors and the free layer in a first direction, the current pulse generating a predetermined level of heat in the sensor and also generating a magnetic field;
   in response to the heat of the current pulse, the antiferromagnetic layers exceeding their blocking temperatures;
   in response to the magnetic field of the current pulse:
   orienting a magnetic spin structure of the first antiferromagnetic layer with a second direction substantially perpendicular to the first direction;
   orienting a magnetic spin structure of the second antiferromagnetic layer with a third direction antiparallel to the second direction;
   in response to orienting of the magnetic spin structure of the first antiferromagnetic layer with the second direction, pinning the first ferromagnetic pinned layer with a magnetization direction parallel to the second direction;
   in response to orienting of the magnetic spin structure of the second antiferromagnetic layer with the third direction, pinning the third ferromagnetic pinned layer with a magnetization direction parallel to the third direction; and
   in response to pinning of the third ferromagnetic pinned layer with a magnetization direction parallel to the third direction, the exchange coupling layer pinning the second ferromagnetic pinned layer with a magnetization direction parallel to the second direction.

21. The method of claim 20, the current pulse having a duration of about 50–100 nanoseconds.

22. The method of claim 20, the current pulse having a magnitude of about 17–18 milliamperes.

23. The method of claim 20, the current pulse having a substantially rectangular shape.

24. A method for biasing a dual spin valve sensor that comprises:

an antiferromagnetic layer having a blocking temperature;

a first ferromagnetic pinned layer abutting the antiferromagnetic layer;

a first non-magnetic conductor layer abutting the antiferromagnetic layer;

a ferromagnetic free layer abutting the first non-magnetic conductor layer;

a second non-magnetic conductor layer abutting the ferromagnetic free layer;

a second ferromagnetic pinned layer abutting the second non-magnetic conductor layer;

an exchange coupling layer abutting the second ferromagnetic layer;

a third ferromagnetic pinned layer abutting the exchange coupling layer;

the exchange coupling layer exhibiting a predetermined level of exchange coupling between the second and third ferromagnetic pinned layers sufficient to pin magnetization directions of the second and third ferromagnetic pinned layers in relatively antiparallel directions;

wherein the second and third ferromagnetic pinned layers have unequal thicknesses relative to each other;

said method comprising:

directing a current pulse through at least one of the conductors and the free layer in a first direction, the current pulse generating a predetermined level of heat in the sensor and also generating a magnetic field;

in response to the heat of the current pulse, the antiferromagnetic layer exceeding its blocking temperature;

in response to the magnetic field of the current pulse, orienting a magnetic spin structure of the first antiferromagnetic layer with a second direction substantially perpendicular to the first direction;

in response to orienting of the magnetic spin structure of the first antiferromagnetic layer with the second direction, pinning the first ferromagnetic pinned layer with a magnetization direction parallel to the second direction;

applying an external magnetic field to the second and third ferromagnetic pinned layers, the magnetic field being oriented in one of the following directions parallel to the second direction, or antiparallel to the second direction; and in response to the external magnetic field, pinning magnetization directions of the second and third ferromagnetic pinned layers in opposite directions to each other.

25. The method of claim 24, wherein the pinning of magnetization directions of the second and third ferromagnetic pinned layers comprises:

pinning a magnetization direction of a thicker one of the second and third ferromagnetic pinned layers in a direction parallel to the external magnetic field;

in response to pinning of the thicker ferromagnetic pinned layer, the exchange coupling layer pinning the thinner ferromagnetic pinned layer with a magnetization direction antiparallel to the external magnetic field.

26. The method of claim 25, the external magnetic field being oriented in the second direction, the second ferromagnetic pinned layer being thicker than the third ferromagnetic pinned layer.

27. The method of claim 25, the external magnetic field being oriented antiparallel to the second direction, the third ferromagnetic pinned layer being thicker than the second ferromagnetic pinned layer.

28. The method of claim 24, the current pulse having a duration of about 50–100 nanoseconds.

29. The method of claim 24, the current pulse having a magnitude of about 17–18 milliamperes.

30. The method of claim 24, the current pulse having a substantially rectangular shape.

* * * * *